(12) United States Patent
Li et al.

(10) Patent No.: US 12,515,931 B1
(45) Date of Patent: Jan. 6, 2026

(54) AUTOMATED GUIDED FORKLIFT, METHOD FOR CONTROLLING AUTOMATED GUIDED FORKLIFT, AND CONTROLLER

(71) Applicant: VisionNav Robotics USA Inc., Acworth, GA (US)

(72) Inventors: Chao Li, Acworth, GA (US); Lei Wei, Acworth, GA (US); Bingchuan Yang, Acworth, GA (US)

(73) Assignee: VISIONNAV ROBOTICS USA INC., Acworth, GA (US)

( * ) Notice: Subject to any disclaimer, the term of this patent is extended or adjusted under 35 U.S.C. 154(b) by 0 days.

(21) Appl. No.: 19/210,173

(22) Filed: May 16, 2025

(51) Int. Cl.
*B66F 9/06* (2006.01)
*B66F 9/075* (2006.01)

(52) U.S. Cl.
CPC ............ *B66F 9/063* (2013.01); *B66F 9/0755* (2013.01)

(58) Field of Classification Search
CPC ............................... B66F 9/063; B66F 9/0755
See application file for complete search history.

(56) References Cited

U.S. PATENT DOCUMENTS

| | | | | |
|---|---|---|---|---|
| 9,632,504 | B1* | 4/2017 | Watts | G05D 1/024 |
| 2020/0073399 | A1* | 3/2020 | Tateno | G05D 1/0251 |
| 2023/0168686 | A1* | 6/2023 | Tateno | G05D 1/224 |
| | | | | 700/28 |
| 2024/0067510 | A1* | 2/2024 | Ulbrich | B66F 9/063 |
| 2025/0066172 | A1* | 2/2025 | Kato | B66F 9/24 |
| 2025/0109002 | A1* | 4/2025 | Anderson-Sprecher | |
| | | | | G05D 1/0246 |

FOREIGN PATENT DOCUMENTS

| | | |
|---|---|---|
| CN | 115546216 A | 12/2022 |
| CN | 116468787 A | 7/2023 |
| CN | 118154679 A | 6/2024 |

OTHER PUBLICATIONS

Baird, R. An Autonomous Forklift Research Platform for Warehouse Operations, Google Scholar, Thesis, Massachusetts Institute of Technology, Sep. 2018, pp. 1-46. (Year: 2018).*

(Continued)

*Primary Examiner* — Russell Frejd
(74) *Attorney, Agent, or Firm* — MUNCY, GEISSLER, OLDS & LOWE, P.C.

(57) ABSTRACT

The present disclosure relates to an automated guided forklift, a method for controlling an automated guided forklift, and a controller. An automated guided forklift is described. The automated guided forklift includes a controller. The controller executes program instructions to perform operations including the following: receiving first optical data; determining depth information of an object based on the first optical data; receiving second optical data, the second optical data including optical information of the object and optical information of a fork of the automated guided forklift; determining a first height difference between the object and the fork based at least in part on the depth information and the second optical data; and moving the fork based at least in part on the first height difference until the first height difference satisfies an insertion condition.

19 Claims, 11 Drawing Sheets

(56) References Cited

OTHER PUBLICATIONS

Olsson et al, E. On visionsystems for pallet identification and positioning for autonomous warehouse vehicles, Google Scholar, Thesis, Linkopings University, Department of Science and Technology, 2017, pp. 1-104. (Year: 2017).*

Tsiogas et al, E. Pallet detection and docking strategy for autonomous pallet truck AGV operation, Google Scholar, 2021 IEEE/RSJ International Conference on Intelligent Robots and Systems (IROS), Sep.- ct. 2021, pp. 3444-3451. (Year: 2021).*

\* cited by examiner

AUTOMATED GUIDED FORKLIFT, METHOD FOR CONTROLLING AUTOMATED GUIDED FORKLIFT, AND CONTROLLER

BACKGROUND OF THE INVENTION

Field of the Invention

The present disclosure generally relates to the field of automated guided forklifts, and more specifically, to an automated guided forklift, a method for controlling an automated guided forklift, and a controller.

Description of the Prior Art

Currently, autonomous driving and operation technologies are increasingly appearing in production and life. For example, an automated guided forklift having autonomous driving and operation capabilities is expected to be used in application scenarios of warehousing and logistics, and the automated guided forklift is expected to complete tasks such as cargo positioning, cargo transportation, and environment perception.

A target cargo of the automated guided forklift is usually placed in a corresponding carrier, for example, placed in a pallet or a material cage. The automated guided forklift is docked with the carrier (such as the pallet or the material cage), to implement cargo transportation. Compared with that the pallet has a standard size and a standard manufacturing parameter, the material cage is usually diversified, and does not have the foregoing standard size or parameter. This is because the cargo targeted by the material cage is usually non-standard or has an irregular size. Consequently, the cargo cannot be placed in a standard pallet. The foregoing features of the material cage bring challenges to controlling and operation of the automated guided forklift. For example, accurate docking between the automated guided forklift and the material cage is one of problems to be resolved.

In addition, even in a case that the standard pallet is used, controlling and operation of the automated guided forklift may not be easily completed. For example, regardless of which carrier is used (the pallet, the material cage, or the like), if the ground on which the automated guided forklift and the carrier are located is not flat, there is a problem in docking between the automated guided forklift and the carrier.

In addition, various deformation of the automated guided forklift and the carrier may also cause a challenge to docking between the automated guided forklift and the carrier.

Therefore, a method and a system that can implement accurate docking between the automated guided forklift and the carrier need to be provided.

BRIEF DESCRIPTION OF THE DRAWINGS

The content disclosed in this specification refers to and includes the following figures.

Figure 1:
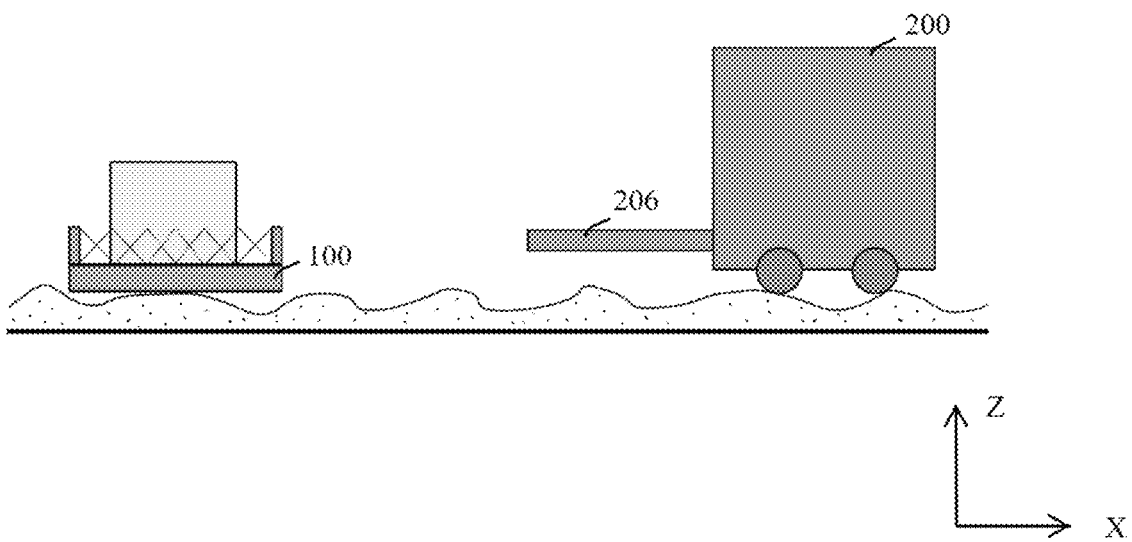
FIG. 1 is a schematic diagram of an automated guided forklift and a carrier according to some embodiments of the present disclosure.

According to common practice, various features described in the figures may not be drawn to scale. Therefore, for clarity, sizes of the various features may be arbitrarily expanded or reduced. Shapes of components described in the figures are merely exemplary shapes, and are not intended to limit actual shapes of the components. In addition, for clarity, the embodiments described in the figures may be simplified. Therefore, the figures may not describe all components of a given device or apparatus. Finally, same reference numerals may be used throughout the specification and the figures to represent same features.

DETAILED DESCRIPTION

To better understand the spirit of the present disclosure, the following further describes the present disclosure with reference to some embodiments of the present disclosure.

A phrase "in an embodiment" or "according to an embodiment" used in this specification does not necessarily refer to a same specific embodiment, and "in other (some) embodiments" or "according to other (some) embodiments" used in this specification does not necessarily refer to different specific embodiments. An objective is, for example, that a claimed subject includes a combination of all or some of specific embodiments of the examples. Meanings of "above" and "below" in this specification are not limited to relationships directly presented in the drawings, and may include other explicit correspondences, such as "left" and "right", or the opposite of "above" and "below". "Connected" or "coupled" referred to in this specification should be understood as including "directly connected" and "connected through one or more intermediate components". Names of various components used in this specification are merely for the purpose of description and do not have a limitation. Different manufacturers may use different names to refer to components having a same function.

The following describes various implementations of the present disclosure in detail. Although specific implementations are described, it should be understood that, these implementations are merely used for illustration. A person skilled in the art recognizes that other components and configurations may be used without departing from the spirit and protection scope of the present disclosure. An implementation of the present disclosure may not necessarily include all components or steps in the embodiments described in the specification, and an execution sequence of steps may also be adjusted based on an actual application.

In addition, for the purpose of clarity, when some features are obvious to a person skilled in the art, detailed descriptions of the features are not described, so as not to obscure the descriptions of the embodiments of the present disclosure. Therefore, the following detailed descriptions should not be construed as limiting.

FIG. 1 shows an application scenario including an automated guided forklift and a carrier according to some embodiments of the present disclosure. A carrier 100 carrying a cargo is placed at an opposite position of an automated guided forklift 200, and the automated guided forklift 200 expects to be docked with the carrier 100, to implement cargo transportation. In an embodiment, the carrier 100 is a material cage. In another embodiment, the carrier 100 is a pallet. In some other embodiments, the carrier 100 is any possible standard or non-standard carrier different from the material cage and the pallet.

In some embodiments, first, the automated guided forklift 200 needs to approach to the carrier 100. Then, the automated guided forklift 200 inserts a fork 206 thereof into docking holes (not shown in FIG. 1, referring to docking holes 133 in FIG. 3) of the carrier 100, to implement docking between the automated guided forklift 200 and the carrier 100.

As shown in FIG. 1, in some application scenarios of the present disclosure, the ground on which the carrier 100 and the automated guided forklift 200 are located is not flat, causing difficulty in docking between the automated guided forklift 200 and the carrier 100. Specifically, in this case, the automated guided forklift 200 cannot complete a docking operation by simply relying on a preset program because a ground clearance of the docking holes 133 and a ground clearance of the fork 206 in the preset program are both inaccurate. In this case, if the docking operation is completed by insisting on relying on the preset program, the fork 206 may collide with the carrier 100 or even crash over the cargo.

In some other application scenarios of the present disclosure, if the carrier 100 is the material cage rather than a standard pallet, because shapes and sizes of material cages are different, it is inappropriate to preset the shape and the size of each material cage in the program (which not only reduces a running speed of the program, but also causes load on a memory and a controller). As a result, the automated guided forklift 200 does not know accurate positions of the docking holes of the material cage in advance.

Although not shown in the figure, in some other application scenarios of the present disclosure, the carrier and the automated guided forklift may be at different levels. For example, the carrier 100 may be located in a carriage of a van, and the automated guided forklift 200 is located on the ground. The carriage height of the van is not a unique standard value. In other cases, the ground on which the van is located may not be flat. Therefore, it is not appropriate to preset the carriage height of each van in the program. As a result, the automated guided forklift does not know accurate positions of the docking holes of the carrier in the carriage of the van in advance.

Referring to FIG. 2 to FIG. 6 of the present disclosure, the present disclosure can enable an automated guided forklift to determine a relative distance between an insertion tool of the automated guided forklift and target docking components in any application scenario, thereby implementing accurate docking. In some embodiments, the insertion tool is a fork. In some embodiments, the docking components are docking holes. In some embodiments, the relative distance is a vertical distance. In some embodiments, the relative distance is a horizontal distance.

Figure 2:
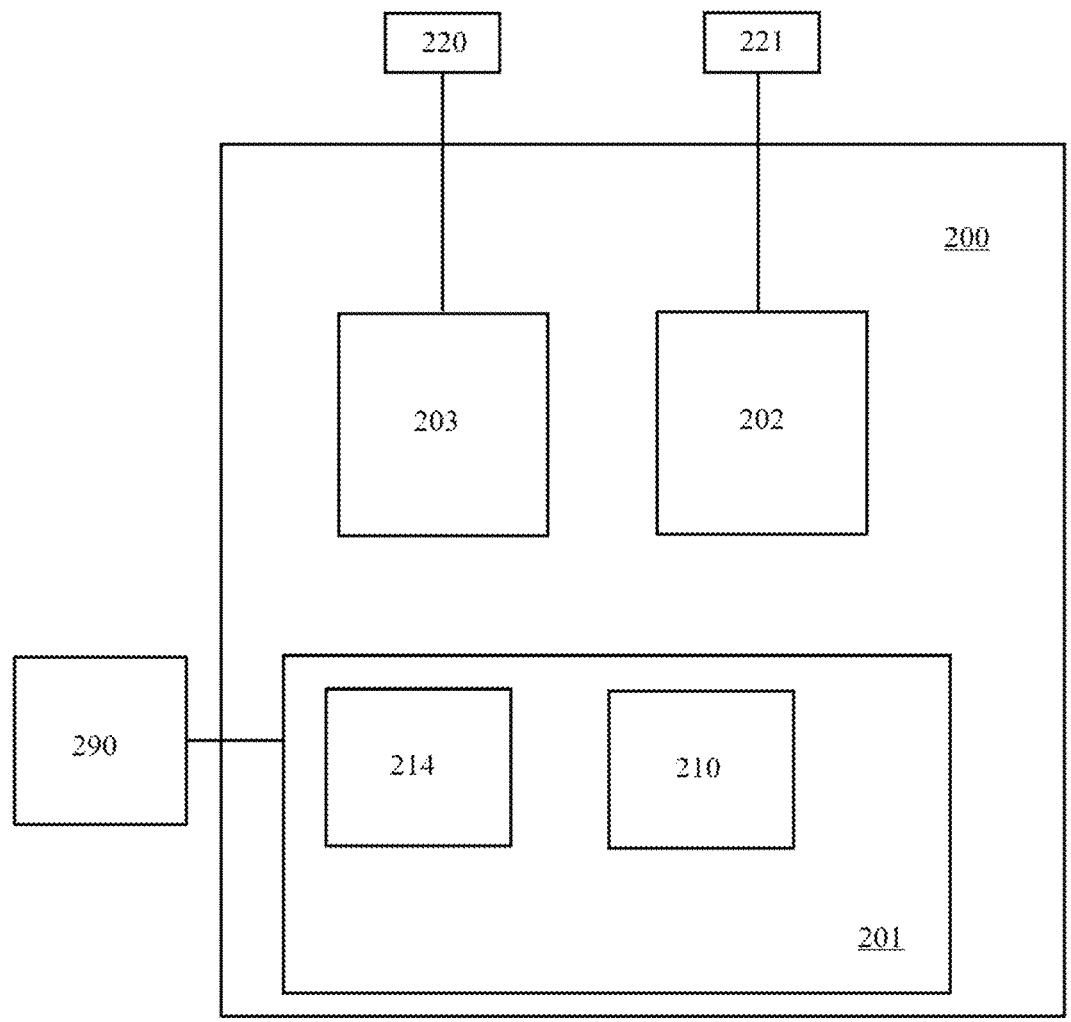
FIG. 2 is a block diagram of an automated guided forklift-based system according to some embodiments of the present disclosure.

FIG. 2 shows an automated guided forklift-based system according to some embodiments of the present disclosure. The system includes a database 290 and the automated guided forklift 200 shown in FIG. 1. In an embodiment, the automated guided forklift 200 includes a controller 201, radar 202, and a camera 203. In another embodiment, the controller 201 is not a part of the automated guided forklift 200, but is located at a remote end, for example, located at a remote server. The controller 201 located at the remote server may communicate with components of the automated guided forklift 200 to control the components, thereby completing various operations. This can lighten the automated guided forklift and reduce running and maintenance costs. Although not shown in the figure, the controller 201 may include parts such as an input/output interface, a mainboard, and a peripheral circuit and element. The controller 201 may include a control algorithm, an operating system, a communication protocol, and the like. In this specification, the controller may refer to a controller set configured to execute same or different tasks (operations).

In an embodiment, the database 290 may be a part of the automated guided forklift 200. In another embodiment, the database 290 may be a cloud database. In this case, the cloud database 290 is coupled to the controller 201 through the known communication protocol and the interface.

The database 290 stores any possible data, such as a parameter and an algorithm, configured to control the automated guided forklift 200. In an embodiment, the database 290 stores a parameter matrix of the radar 202. In an embodiment, the database 290 stores a parameter matrix of the camera 203. In an embodiment, the database 290 stores a parameter matrix of the automated guided forklift 200. In some other embodiments, the database 290 stores one or more of the parameter matrix of the radar 202, the parameter matrix of the camera 203, and the parameter matrix of the automated guided forklift 200. In some other embodiments, one or more of the parameter matrices are stored in a memory 214 of the controller 201. In some embodiments, the parameter matrices further include an external parameter matrix and an internal parameter matrix.

In some embodiments, the controller 201 may obtain, from an upper device (such as a sensor or a remote control system), various types of information for a corresponding control operation, for example, position information of the carrier 100, position information of the automated guided forklift 200, position information of the fork 206, size information of the fork 206, insertion height information of the fork 206, and thickness information of a beam 106. In some embodiments, the various types of information may be obtained through the database 290. In some embodiments, one or more of the information may be preset information, or may be information obtained through an actual measurement.

The controller 201 may include a processor 210. The processor 210 may run a control algorithm and the like, and cause an executor to complete a corresponding task and operation. The processor 210 may include, but is not limited to, a central processing unit (CPU), a digital signal processor (DSP), a micro-controller unit (MCU), and the like. In this specification, the processor 210 may refer to a processor set configured to execute same or different tasks (operations). In some embodiments, the processor 210 may be communicatively coupled to the radar 202 and the camera 203, to control the automated guided forklift 200. In some embodiments, the radar 202 is a lidar. In some embodiments, the camera 203 is configured to photograph an image of a target object in a real scenario.

Specifically, the radar 202 and the camera 203 are configured to obtain corresponding optical data. The processor 210 determines, based on the optical data obtained from the radar 202 and the camera 203 and the various types of information, and based on data in the memory 214 and/or the database 290, one or more parameters configured to control operations of the automated guided forklift 200. The one or more parameters include parameters determined based on various methods and steps described below. Then, the processor 210 sends, based on the determined parameter, one or more commands configured to control various operations of the automated guided forklift 200. After receiving the command, the components or the executor of the automated guided forklift 200 may start corresponding operations to complete corresponding tasks.

In some embodiments, the optical data includes point cloud data 221 (sometimes referred to as "data 221" for short below). In some embodiments, the optical data includes image data 220 (sometimes referred to as "data 220" for short below). In some embodiments, the optical data includes the point cloud data 221 and the image data 220.

The system shown in FIG. 2 can perform fusion processing on different types of optical data to implement accurate control on the insertion tool of the automated guided forklift. Specific implementation processes of the accurate control are described below with reference to FIG. 3 to FIG. 6.

Figure 3:
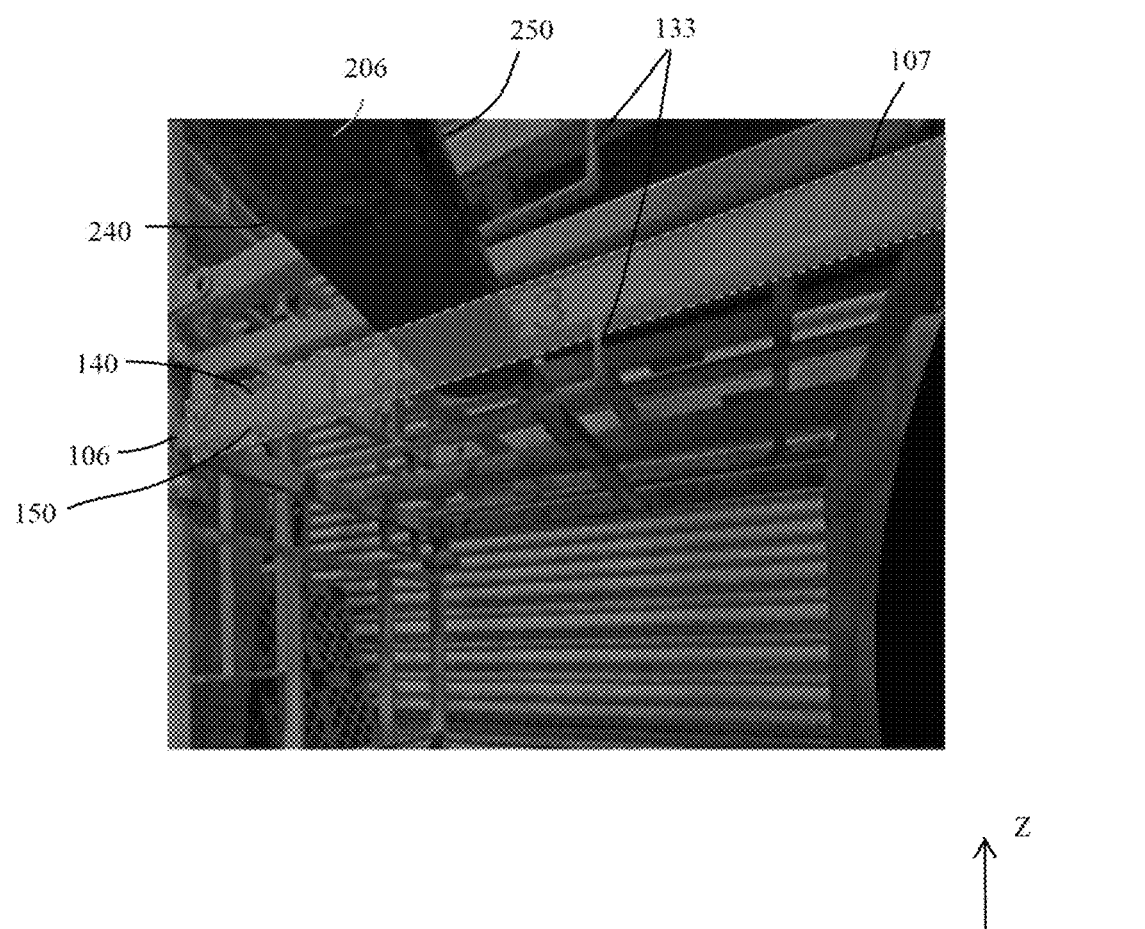
FIG. 3 shows image data captured by a camera in some embodiments of the present disclosure.

The processor 210 is configured to determine depth information of the object by using the data 221. Referring to FIG. 1 and FIG. 3, the depth information of the carrier 100 represents a distance (a depth) between the carrier 100 and the automated guided forklift 200 in a direction of an X axis of a three-dimensional coordinate system. Unless otherwise specified, a depth value/information described below represents coordinates or a position on the X-axis of the three-dimensional coordinate system, and a height value/information represents coordinates or a position on a Z-axis of the three-dimensional coordinate system. In some embodiments, the processor 210 identifies points associated with an object of interest from the data 221, and extracts a corresponding point cloud range from the associated points. Referring to FIG. 3, the object of interest may include, but is not limited to, the beam 106 of the carrier 100. In the embodiment of FIG. 3, a point cloud range 107 corresponding to the beam 106 is shown by a dashed line box. The beam 106 includes an edge 140 and an edge 150. Based on the point cloud range 107 and an internal parameter of the automated guided forklift 200, the processor 210 can determine distance (depth) information between the beam 106 and the fork 206 of the automated guided forklift 200.

In an embodiment, the image data 220 obtained by the camera 203 includes image data shown in FIG. 3. The processor 210 is configured to process the image data 220 to obtain image data shown in FIG. 4a and FIG. 4b.

Processing the image data 220 includes performing a parameter-free edge line extraction method. In some embodiments, the parameter-free edge line extraction method includes a cannyline-based method. In some other embodiments, the parameter-free edge line extraction method includes any method known in the art. After the edge line extraction method is completed, image data including the group of contour edge lines shown in FIG. 4a is obtained.

Figure 4A:
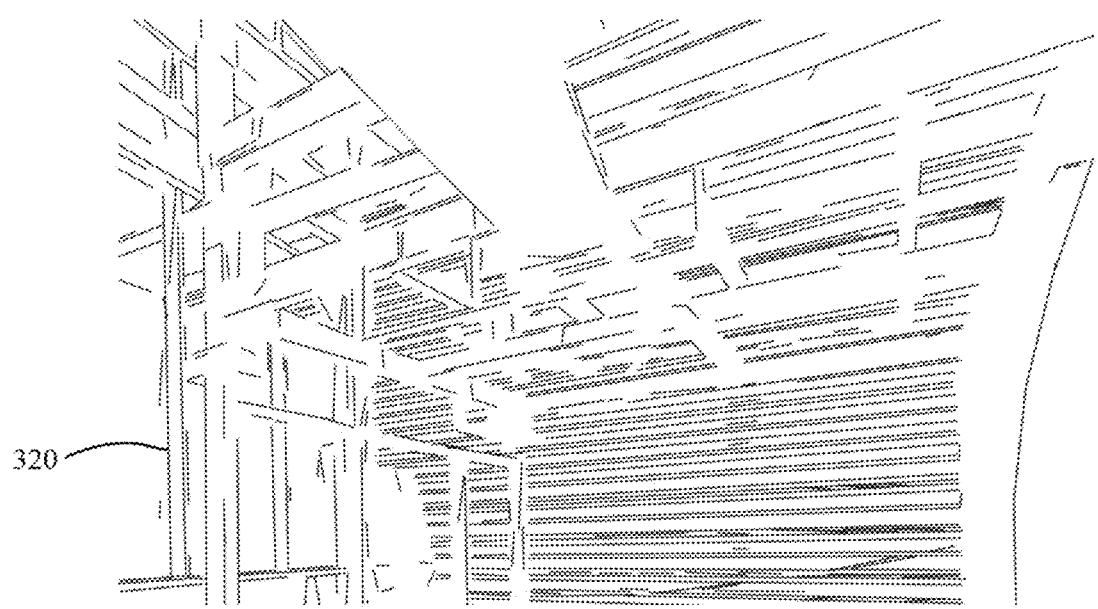
FIG. 4a and FIG. 4b show image data obtained after an edge line extraction algorithm is used for an image shown in FIG. 3 in some embodiments of the present disclosure.
Figure 4B:
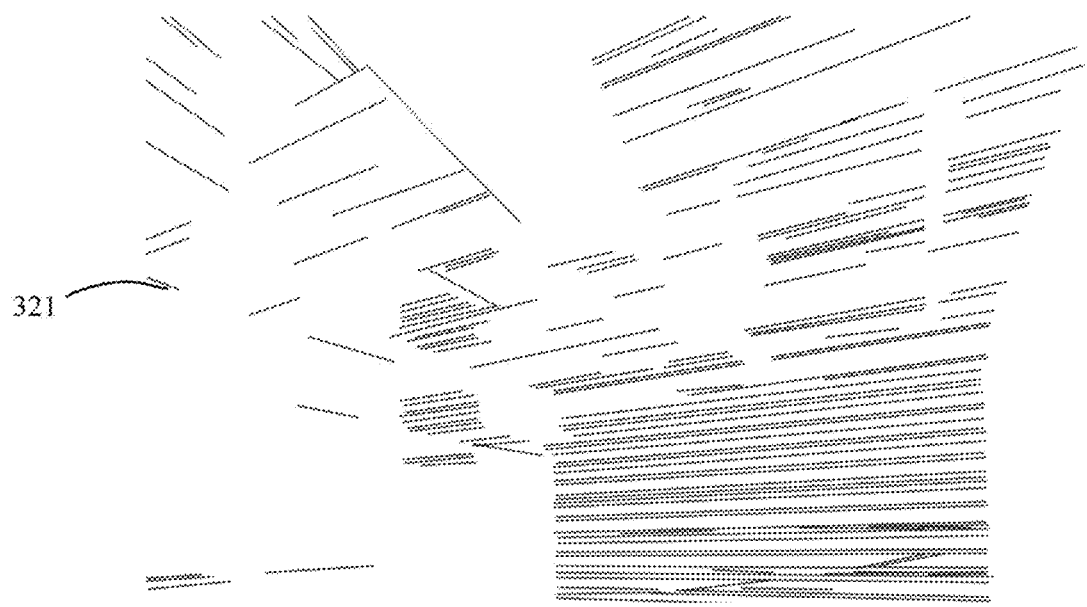

Further with reference to FIG. 4a and FIG. 4b, a line satisfying a condition in the group of contour edge lines needs to be further removed according to prior knowledge. One of objectives of the removal operation is to remove a line, for example, a line 320, that is generally vertical or has an extremely large slope in the image data. However, it is not expected to incorrectly delete a line corresponding to the fork 206 in the image data. Therefore, the condition needs to be accurately set. In some embodiments, coordinates of two points on an outer edge of the fork, for example, a point A (x1, y1, z1) and a point B (x2, y2, z2), may be determined based on a position (the position may be obtained, for example, from the upper computer) of the fork in three-dimensional space. Two points, for example, a point a (xa, ya, za) and a point b (xb, yb, zb) that respectively correspond to the point A and the point B in an image may be calculated through an external parameter of the camera 203 and an external parameter of the radar 202. A slope of the line corresponding to the fork 206 may be determined based on the point a and the point b. The condition used in the removal operation may be set based on the determined slope, thereby avoiding incorrect deletion of the line corresponding to the fork 206 in the image data. In some embodiments, the slope is represented as tanα, and α is an angle value. In an embodiment, α is preferably about 80°. In some embodiments, the condition includes that an angle between the line and the Z axis in the three-dimensional coordinate system is greater than 0° and less than or equal to an angle threshold. In an embodiment, the angle threshold is about 10°. In the three-dimensional coordinate system described in the context of the present disclosure, a plane vertically facing the fork of the automated guided forklift is a YZ plane (referring to FIG. 3), and the automated guided forklift moves closer to and away from the carrier along the X axis (referring to FIG. 1). Therefore, side surfaces of the automated guided forklift and the carrier belong to an XZ plane.

The objectives of the removal operation further include removing interference caused by actual missing, stains, patterns, and the like on the beam 106. Specifically, these missing, stains, and patterns may also be incorrectly identified as lines in an image processing process, thereby affecting accuracy of the algorithm. Generally, sizes of these missing, stains, and patterns are within a given range (for example, within a range of several centimeters), and size values of these missing, stains, and patterns may be converted into pixel values in the image data by using the external parameter of the camera 203, the external parameter of the radar 202, and the depth information of the automated guided forklift 200. The condition used in the removal operation may be set based on the pixel value, thereby eliminating interference caused by actual missing, stains, patterns, and the like on the beam 106. In some embodiments, the condition includes that a length pixel value of the line is less than or equal to a pixel value threshold. In an embodiment, the pixel value threshold is about 20.

To implement control with different precision in different application scenarios, the corresponding conditions mentioned above may be combined. In some other embodiments of the present disclosure, the condition used in the removal operation includes that an angle between the line and the Z axis in the three-dimensional coordinate system is greater than 0° and less than or equal to the angle threshold, and the length pixel value of the line is less than or equal to the pixel value threshold. In an embodiment, the angle threshold is about 10°, and the pixel value threshold is about 20.

Figure 5A:
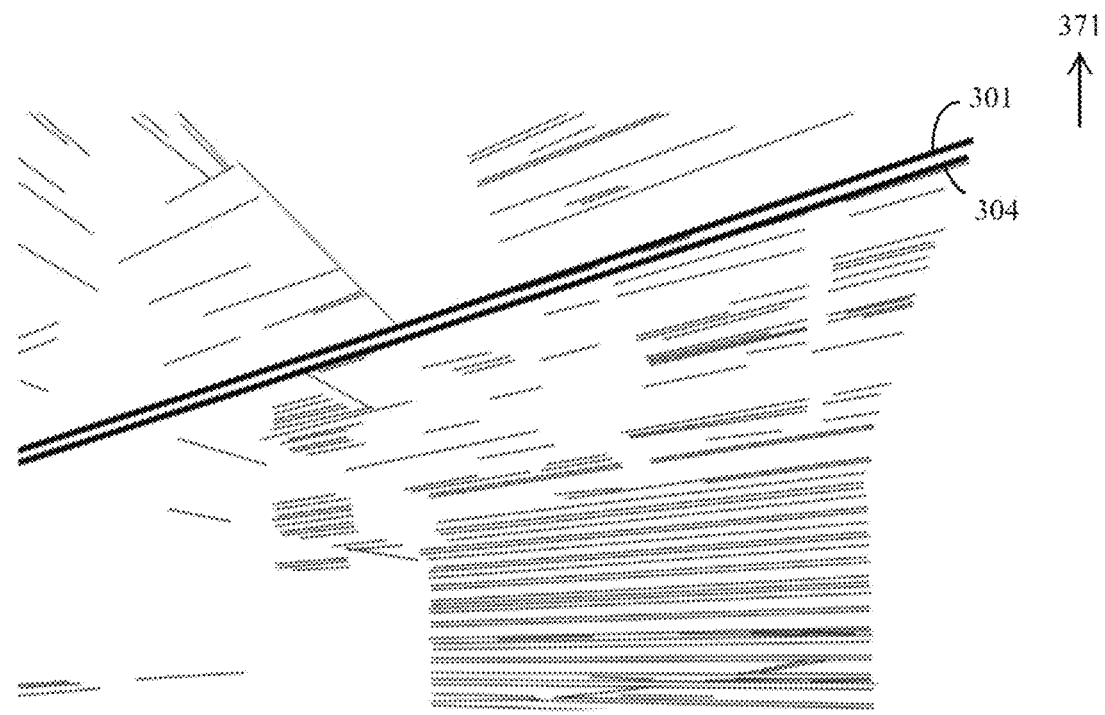
FIG. 5a to FIG. 5c and FIG. 6 show methods for determining a distance between two objects according to some embodiments of the present disclosure.

After the removal operation is performed, image data shown in FIG. 4b is obtained. It can be learned that, the line, for example, the line 320 is removed, and the line, for example, the line 321 is reserved. As shown in FIG. 5a, a line 304 corresponding to the beam 106 needs to be further positioned in the image data shown in FIG. 4b. In an embodiment, the line 304 corresponding to the beam 106 may be determined in the image data based on position information of the beam 106, the preset insertion height of the fork 206, and thickness information of the beam 106 in the three-dimensional space. With reference to FIG. 3 and FIG. 5a, in an embodiment, the line 304 is located between the edge 140 and the edge 150 of the beam 106, and an extension direction of the line 304 is the same as extension directions of the edge 140 and the edge 150. In an embodiment, the edge 140 is an upper edge. In an embodiment, the edge 150 is a lower edge. In an embodiment, the line 304 is located exactly in the middle of the edge 140 and the edge 150. In an embodiment, the line 304 is located between the edge 140 and the edge 150, and is closer to the edge 140. In an embodiment, the line 304 is located between the edge 140 and the edge 150, and is closer to the edge 150. After the line 304 is determined, the line 301 is positioned near the line 304.

In an embodiment shown in FIG. 5a, the operation of positioning the line 301 includes respectively traversing the image data in a direction indicated by an arrow 371 by using a corresponding pixel of the line 304 as a start point, until a first black pixel point is found during each traversal. Least squares line fitting is performed on all found black pixel points, to obtain the line 301, and the obtained line 301 corresponds to the edge 140. In an embodiment, the direction indicated by the arrow 371 is upward. In another embodiment, the direction indicated by the arrow 371 is a direction away from the ground. In other words, the direction may not be completely vertically upward.

Although not shown in the figure, depending on a viewing angle of the camera and a position of the photographed target fork in the image, in another embodiment of the present disclosure, the line 301 may be positioned below the line 304 or in a direction towards the ground. Specifically, the image data is traversed downward (for example, in an opposite direction of the direction indicated by the arrow 371) by using the corresponding pixel of the line 304 as the start point, until the first black pixel point is found during each traversal. Least squares line fitting is performed on all found black pixel points, to obtain the line 301, and the obtained line 301 corresponds to the edge 150. In another embodiment, an opposite direction of the direction indicated by the arrow 371 is a direction approaching the ground. In other words, the direction may not be completely vertically downward.

Figure 5B:
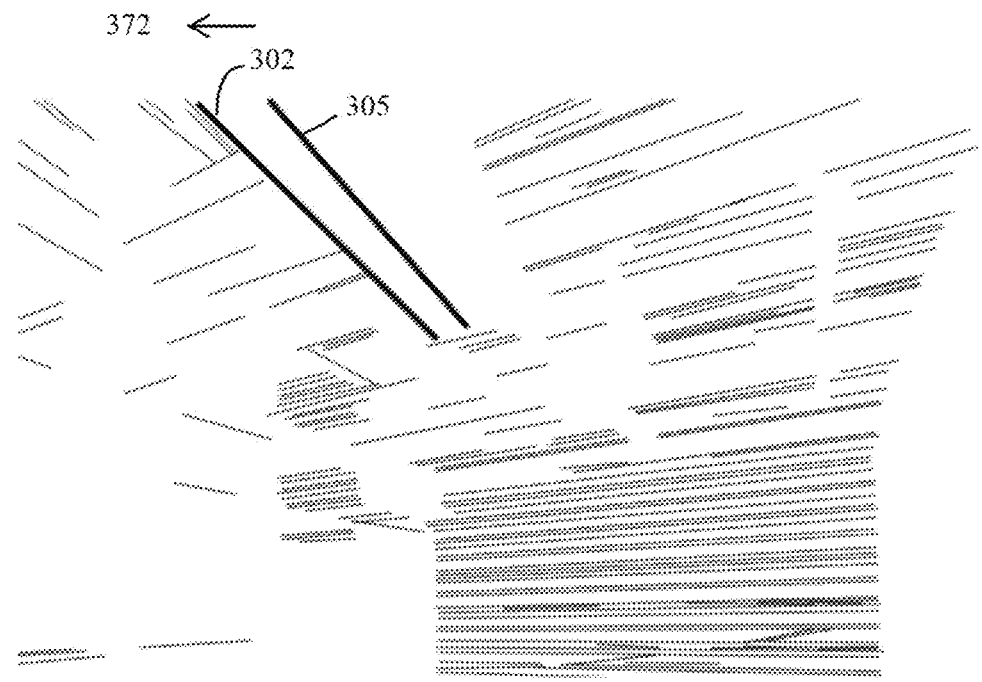

Further referring to FIG. 5b, a line 305 corresponding to the fork 206 needs to be further positioned in the image data shown in FIG. 4b. In an embodiment, coordinates of a point at a fork tip of the fork and the line 305 passing through two points on the fork along an extension direction of the fork may be determined based on the position information of the fork 206 and the size information of the fork 206. With reference to FIG. 3 and FIG. 5b, in an embodiment, the line 305 is located between an edge 240 and an edge 250 of the fork 206, and the extension direction of the line 305 is the same as extension directions of the edge 240 and the edge 250. In an embodiment, the edge 240 is an outer side edge. In an embodiment, the edge 250 is an inner side edge. In an embodiment, the line 305 is located exactly in the middle of the edge 240 and the edge 250. In an embodiment, the line 305 is located between the edge 240 and the edge 250, and is closer to the edge 240. In an embodiment, the line 305 is located between the edge 240 and the edge 250, and is closer to the edge 250. After the line 305 is determined, the line 302 is positioned near the line 305.

In an embodiment shown in FIG. 5b, the operation of positioning the line 302 includes respectively traversing the image data in a direction indicated by an arrow 372 by using a corresponding pixel of the line 305 as a start point, until the first black pixel point is found during each traversal. Least squares line fitting is performed on all found black pixel points, to obtain the line 302, and the obtained line 302 corresponds to the edge 240. In an embodiment, the direction indicated by the arrow 372 is outward. In another embodiment, the direction indicated by the arrow 372 is a direction away from the edge 250. In other words, the direction may not be completely horizontally outward.

A person skilled in the art may understand that, a quantity and a position of the fork of the automated guided forklift may be set flexibly. Although not shown in the figure, in another embodiment of the present disclosure, the target fork photographed by the camera may be another fork configured in pair with the fork 206. In this embodiment, the line 302 may be positioned in an opposite direction of the direction indicated by the arrow 372. Specifically, the image data is traversed by using the corresponding pixel of the line 305 as the start point in the opposite direction of the direction indicated by the arrow 372, until the first black pixel point is found during each traversal. Least squares line fitting is performed on all found black pixel points, to obtain the line 302, and the obtained line 302 corresponds to an outer side edge of another fork.

In another embodiment of the present disclosure, a plurality of lines 302 may be respectively determined for a plurality of forks (for example, the fork 206 and another fork mentioned above) by using the method described above, to obtain a more accurate fork docking effect. Especially, when two docking holes are deformed, such a method can obtain a significant beneficial effect.

Figure 5C:
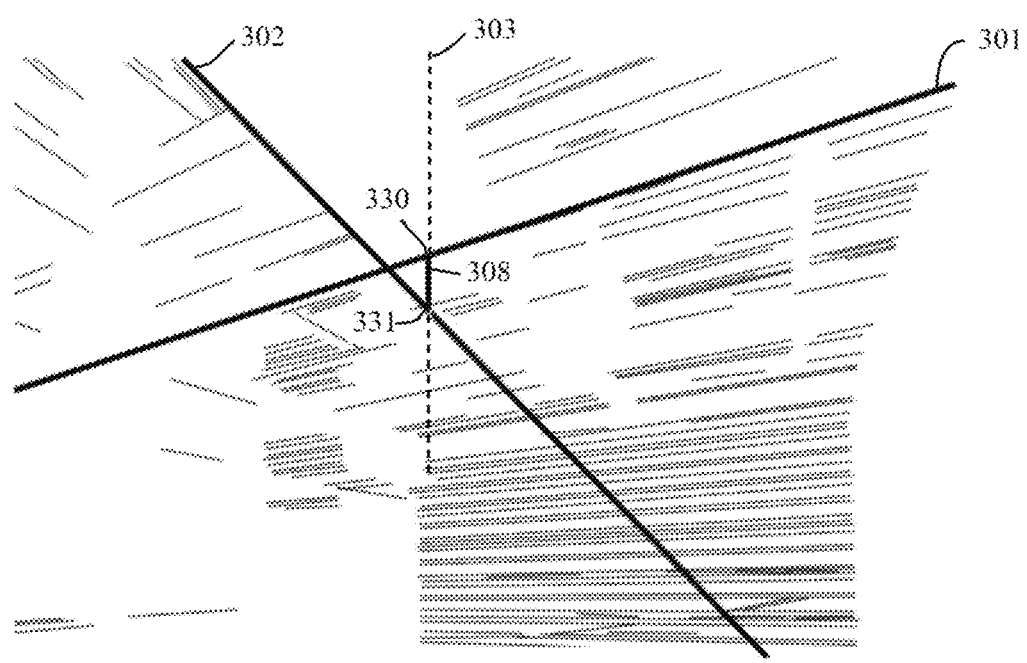

As shown in FIG. 5c, after the line 301 and the line 302 are determined, the processor 210 may be further configured to determine a line 303 intersecting with the line 301 and the line 302 respectively. In some embodiments, the line 303 is determined through the following equation:

$$\begin{bmatrix} u \\ v \\ 1 \end{bmatrix} = K \cdot E \cdot \begin{bmatrix} d \\ y \\ z* \end{bmatrix} \quad \text{(Equation 1)}$$

K represents an external parameter matrix of the camera; E represents an internal parameter matrix of the camera; d represents a depth value of the carrier, where as described above, the value may be obtained, for example, based on the point cloud range and an internal parameter of a moving carrier; y represents a position of the carrier on the Y axis of the three-dimensional coordinate system, where the position may be obtained through calculation based on the position information of the fork and the position information of the material cage; z* represents a data group [z−m, z−m+0.001, z−m+0.002, . . . , z+m−0.001, z+m], that is, an array with a step size of 1 mm; z represents a height value of the fork, where in an embodiment, the height value of the fork may be obtained from the position information of the fork; m represents a set value, where in an embodiment, the value of m may be set to be greater than twice a sum of the thickness of the beam and the thickness of the fork; and u and v are coordinate values in the pixel.

As shown in FIG. 5c, after the line 301, the line 302, and the line 303 are determined, the processor 210 may be further configured to determine an intersection point 330 between the line 303 and the line 301, and an intersection point 331 between the line 303 and the line 302. Further, a line segment 308 between the intersection point 330 and the intersection point 331 is positioned in the image data. The line segment 308 has a distance value (or a length value), and in the image data, the distance value is a pixel value occupied by the line segment 308. In an embodiment, a height difference h1 corresponding to the line segment 308 in the three-dimensional space is determined through the following equation:

$$h1 = (n*x)/fy \quad \text{(Equation 2)}$$

n represents the pixel value occupied by the line segment 308; x represents the depth value of the carrier; and fy represents the internal parameter of the camera.

Figure 6:
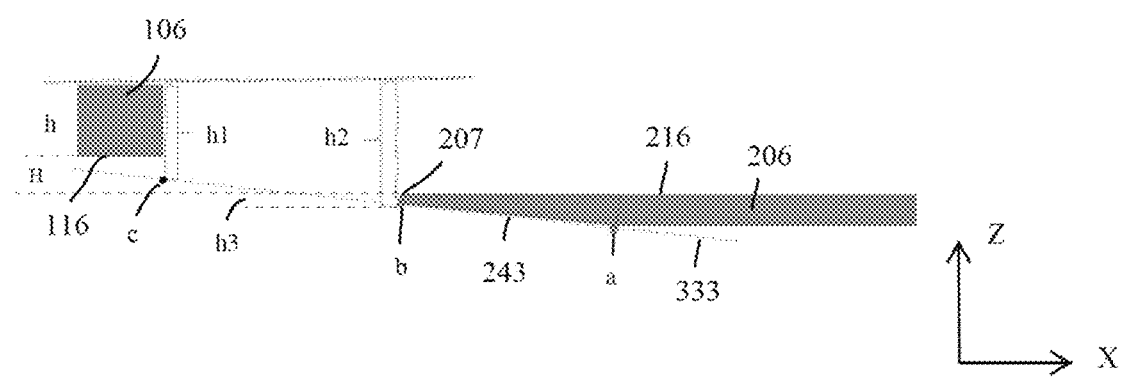

Further referring to FIG. 6, the fork may have a thickness value h3. In some embodiments, a surface 243 of the fork is not flat, and the thickness value h3 may generally correspond to the thickness of the fork tip 207 of the fork 206. In an embodiment, the surface 243 is a lower surface of the fork. The processor 210 may be further configured to determine coordinate values of the point a and the point b in the three-dimensional coordinate system based on the thickness value h3, the height value of the fork, and a width value of the fork. A linear equation of a line 333 (referring to a dashed line partially coinciding with the surface 243 in FIG. 6) extending through the point a and the point b in the X-Z plane may be calculated based on the coordinate values of the point a and the point b. Because depth information of the point b and depth information of a point c are known, a depth difference between the point c and the point b can be obtained. Further, a height difference between the point c and the point b can be calculated according to the linear equation of a line 333. A height difference h2 may be obtained by adding the height difference and the height difference h1. With reference to FIG. 3, FIG. 5b, and FIG. 6, the line 333 corresponds to the line 302. In some embodiments, the depth information of the point b may be obtained based on the position information of the fork, and the depth information of the point c may be obtained based on the depth information of the carrier.

Further, a height difference H between a surface 216 of the fork 206 and a surface 116 of the beam 106 is determined through the following equation, where h is a thickness value of the beam 106:

$$H = h2 - h - h3 \quad \text{(Equation 3)}$$

In an embodiment, the surface 116 is a lower surface of the beam 106. In an embodiment, the surface 216 is an upper surface of the fork 206. After the height difference H is obtained through calculation, the processor 210 is further configured to send the height difference H to the processor 210 of the automated guided forklift 200. The processor 210 may continuously adjust the position of the fork 206 based on the height difference H, so that the fork 206 can be finally accurately inserted into the docking holes 133. In some embodiments, the processor 210 may move the fork 206 based on the height difference H, so that the height difference H continuously decreases until the height difference H satisfies an insertion condition.

After it is determined that the height difference H satisfies the insertion condition, the processor 210 may move the fork 206, so that the fork 206 is inserted into the docking holes 133. In some embodiments, when the height difference H is less than or equal to a difference between height values of the docking holes 133 and the thickness value h3, it is determined that the height difference H satisfies the insertion condition. In some embodiments, the insertion condition requires that the height difference H is greater than or equal to an insertion preset value, thereby avoiding collision between the fork and the beam. In some embodiments, the insertion preset value may be equal to about 5 mm. In some embodiments, the insertion preset value may be equal to about 3 mm. In some embodiments, the insertion preset value may be equal to about 7 mm. Methods according to some embodiments of the present disclosure are described with reference to FIG. 7 to FIG. 10. As described above, these methods may be implemented by the controller 201. Specifically, the methods are implemented by the processor 210 of the controller 201.

Figure 7:
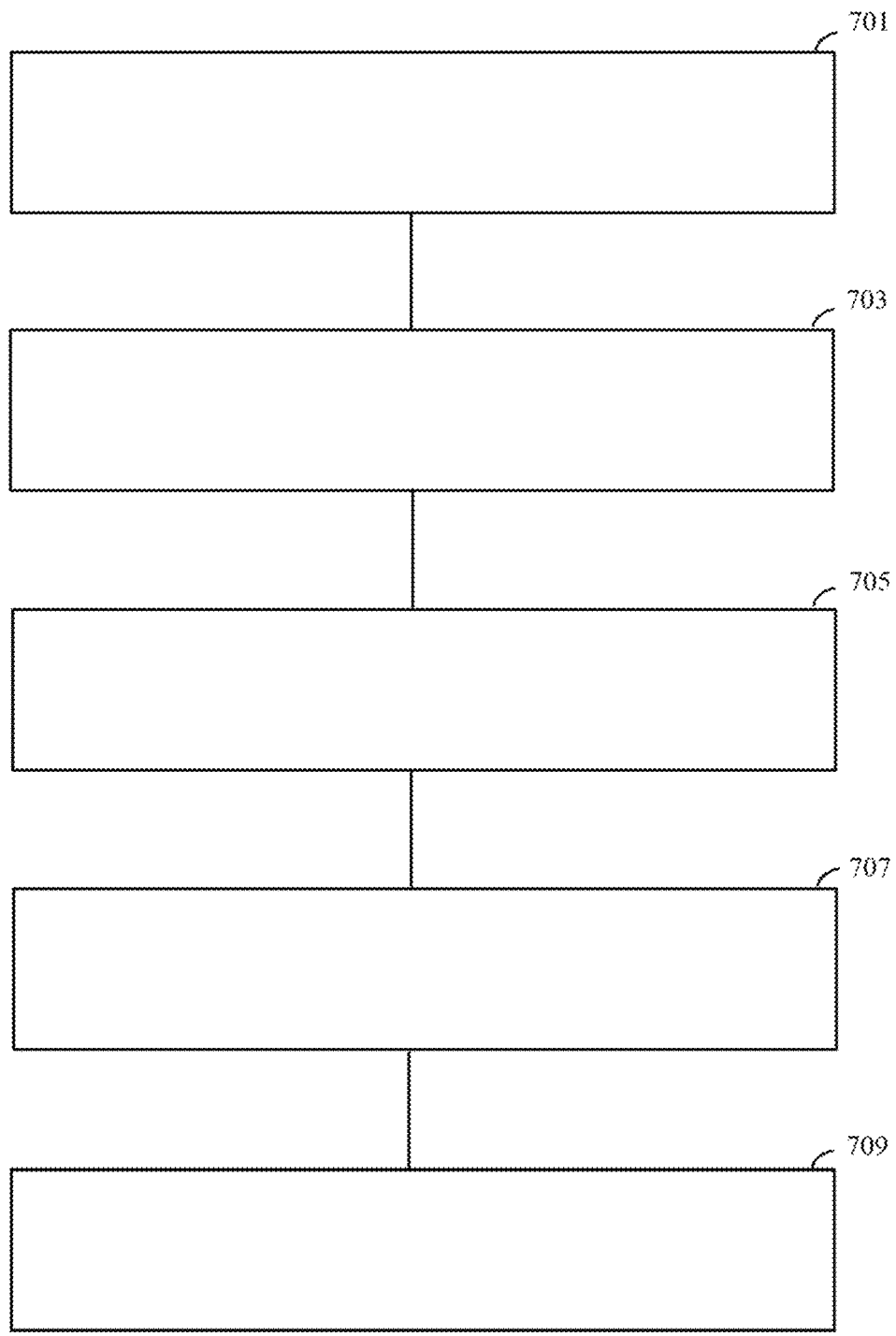
FIG. 7 to FIG. 10 are flowcharts of methods according to some embodiments of the present disclosure.

As shown in FIG. 7, at step 701, determining depth information of an object based on optical data. In an embodiment, the optical data is the point cloud data 221 from the radar 202. In an embodiment, the object is the beam 106 of the carrier 100.

At step 703, receiving another optical data. In an embodiment, another optical data is the image data 220 from the camera 203.

At step 705 obtaining a line corresponding to the object and a line corresponding to another object respectively. In an embodiment, another object is the fork 206. In an embodiment, the line corresponding to the object is the line 301. In an embodiment, the line corresponding to another object is the line 302. Then, in an embodiment, the line 303 intersecting with the line 301 and the line 302 is determined.

At step 707, determining the intersection point 330 of the line 301 and the line 303, and determining another intersection point 331 of the line 302 and the line 303. Further, a distance value between the intersection point 330 and the intersection point 331 is determined.

At step 709, determining a height difference between the object and another object. As described above, the height difference represents a coordinate difference or a position difference on the Z-axis of a three-dimensional coordinate system. In an embodiment, the height difference is a height difference between a lower surface of the object and an upper surface of another object. In some embodiments of the present disclosure, one or more of step 701 to step 709 are executed by the processor 210 of the controller 201.

Figure 8:
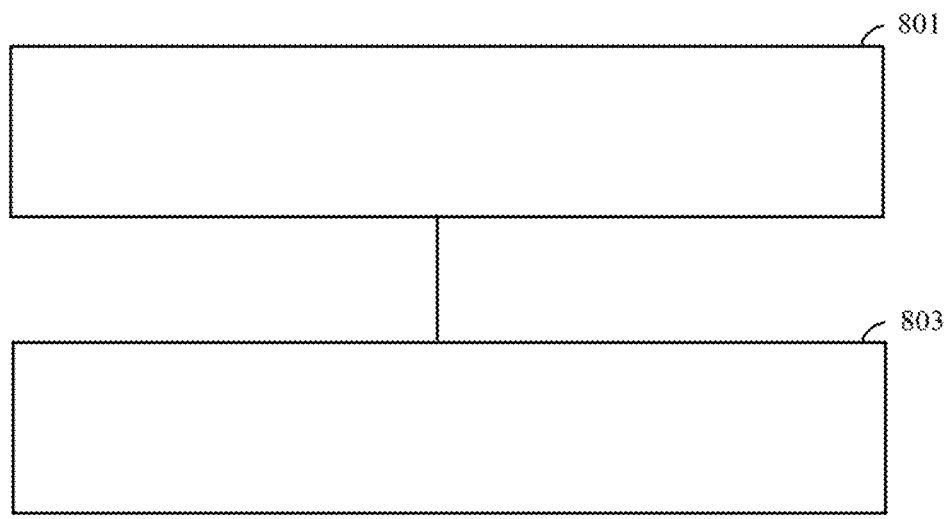

As shown in FIG. 8, at step 801, extracting the group of contour lines from, for example, another optical data received in step 703. In an embodiment, the group of contour lines corresponds to the contour line shown in FIG. 4a.

At step 803, removing a line that conforms to a preset condition from the group of contour lines. As described above, the preset condition is associated with the angle between the line and the Z axis. The preset condition is further associated with a length pixel value of the line. In some embodiments of the present disclosure, one or more of step 801 and step 803 are executed by the processor 210 of the controller 201.

Figure 9:
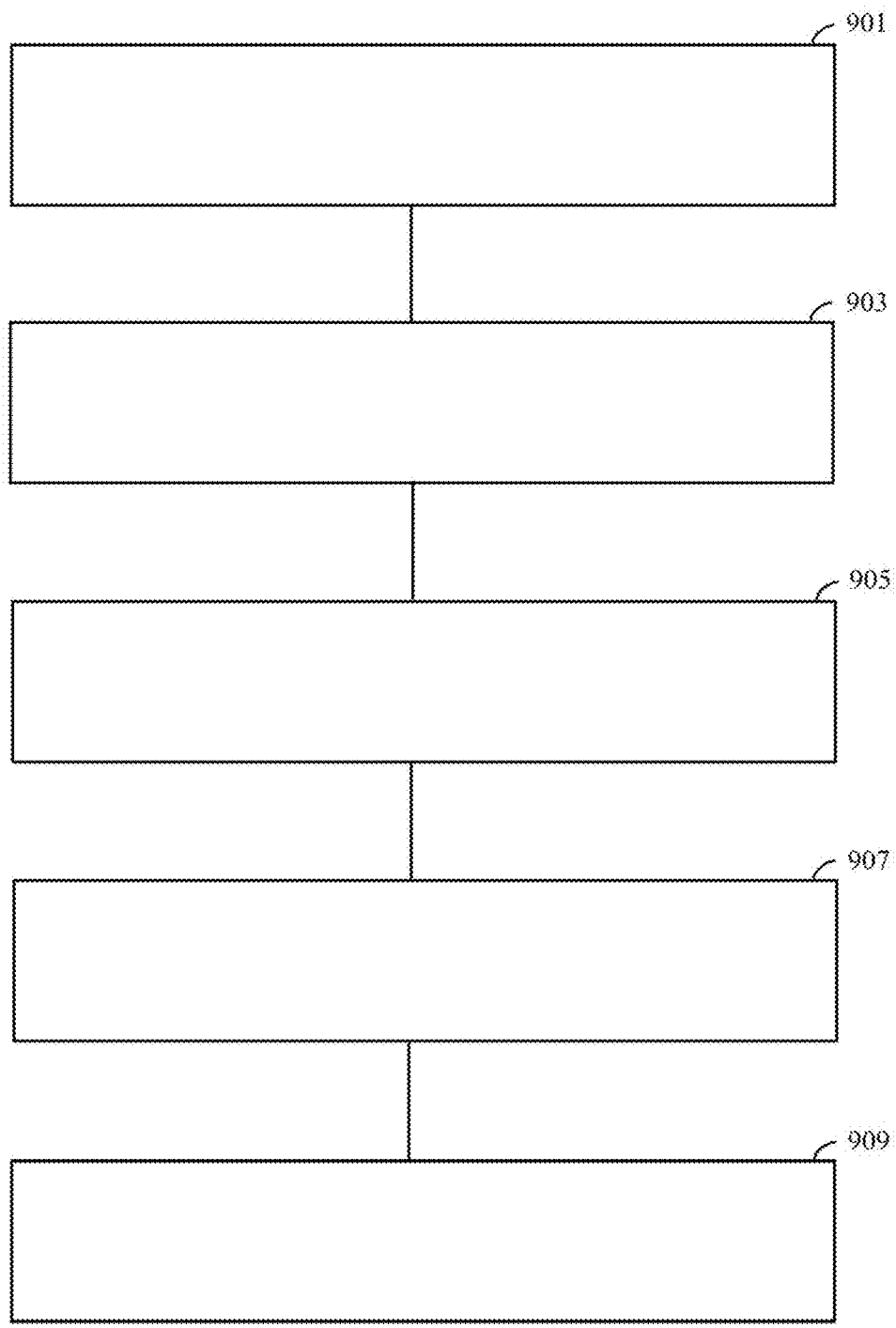

As shown in FIG. 9, at step 901, determining the line 304 based on, for example, another optical data received in step 703. At step 903, positioning the line 301 based on the line 304. As described above, in some embodiments of the present disclosure, the operation of positioning the line 301 involves traversing another optical data to find a pixel point of interest.

At step 905, determining the line 305 based on, for example, another optical data received in step 703. At step 907, positioning the line 302 based on the line 305. As described above, in some embodiments of the present disclosure, the operation of positioning the line 302 involves traversing another optical data to find a pixel point of interest.

At step 909, determining the line 303 intersecting with the line 301 and the line 302 respectively. As described above, in an embodiment, the line 303 is determined by using Equation 1. In some embodiments of the present disclosure, one or more of step 901 to step 909 are executed by the processor 210 of the controller 201.

Figure 10:
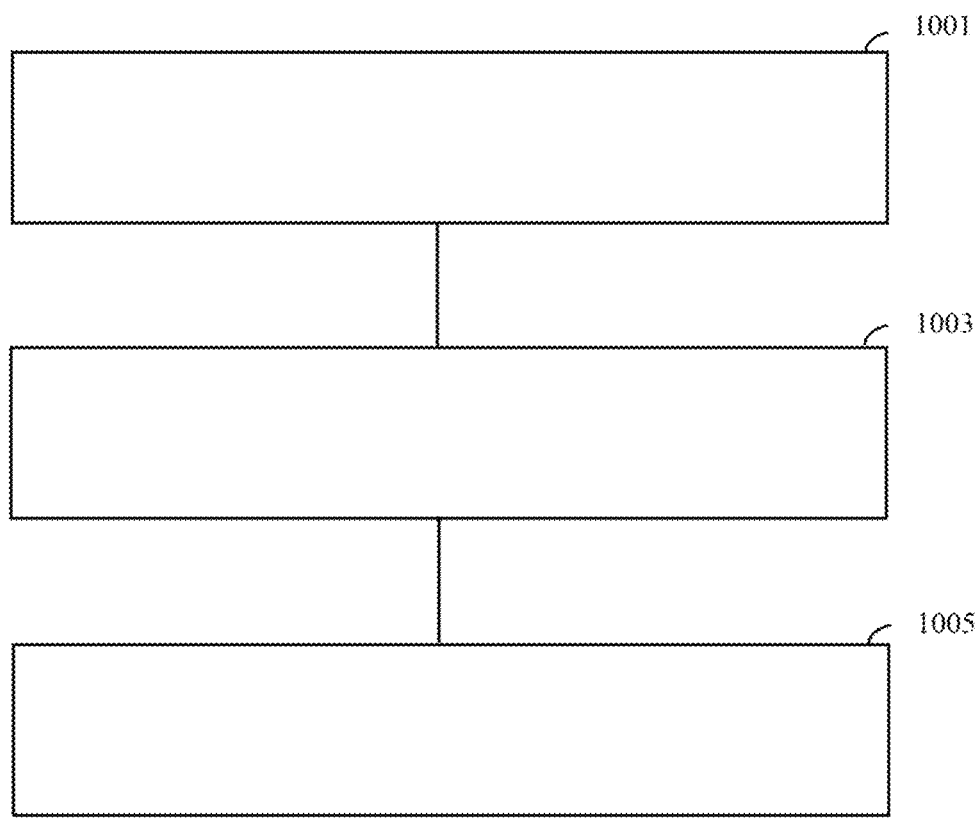

As shown in FIG. 10, at step 1001, determining a height difference h1 based on a distance value between the intersection point 330 and the intersection point 331. As described above, in an embodiment, the height difference h1 is determined by using Equation 2.

At step 1003, determining a height difference h2 based on the height difference h1.

At step 1005, determining a height difference H based on the height difference h2. As described above, in an embodiment, the height difference H is determined by using Equation 3. The height difference H may be continuously determined, and the fork 206 are continuously moved based at least in part on the determined height difference H. As a result, the height difference H may be continuously reduced until the height difference satisfies an insertion condition. After it is determined that the height difference satisfies the insertion condition, the fork 206 may be inserted into the docking holes 133.

It should be understood that, the processor 210 of the controller 201 may execute one or more of step 1001 to step 1005. The processor 210 of the controller 201 may execute any method/step/operation described above.

The one or more methods described herein can obtain many beneficial aspects. Specifically, the not-flat ground may cause the automated guided forklift to jolt, vibrate, or be misaligned with a horizontal plane, and further cause inaccuracy of the point cloud data, for example, cause the point cloud data to become "thick". The inaccurate point cloud data further causes incorrect calculation of the heights of the docking holes of the carrier, finally causing the fork of the automated guided forklift to be unable to accurately insert into the docking holes of the carrier. Therefore, it is disadvantageous to perform fork-in operation only by relying on the point cloud data from the radar. In addition, to perform fork-in operation by using the image data from a camera, images of each type of material cage (the material cage does not have a standard size) need to be labeled, and data needs to be collected for each type of material cage to respectively perform deep learning algorithm training. This definitely causes a huge workload, and is not beneficial to resolving the black box problem using deep learning. Therefore, it is also disadvantageous to perform fork-in operation only by relying on the image data from the camera. One or more methods described herein resolve the foregoing defect by using fusion of the point cloud data and the image data. It should be noted that, the fusion of the point cloud data and the image data described in this specification is not using the point cloud data and the image data separately in isolation in the method, but optimizing processing of the image data by using the point cloud data, to obtain an accurate control parameter.

In addition, the one or more methods described in this specification may further fundamentally resolve problems, such as collision and mismatch, in a docking process caused by deformation of the fork and the material cage. In addition, in some cases, two docking holes of the material cage may be deformed, so that a central connection line of the two docking holes is not horizontal (that is, actual space for the fork to be inserted into the two docking holes is reduced), and the one or more methods described in this specification may also be used to implement docking in the foregoing cases. In other words, because of extremely high accuracy brought by the method, a docking operation can be implemented in extreme/severe cases.

According to another aspect of the present disclosure, a non-transitory computer-readable medium is provided. The non-transitory computer-readable medium stores instructions, and when the instructions are executed, a controller (for example, a controller 201) is caused to perform one or more steps of the methods described in FIG. 7 to FIG. 10.

In an embodiment, the non-transitory computer-readable medium is a single medium. In another embodiment, the non-transitory computer-readable medium is a set of multiple sub-media.

In some embodiments, the non-transitory computer-readable medium includes (but is not limited to) a solid-state memory, an optical medium, and a magnetic medium. In some other embodiments, the non-transitory computer-readable medium includes a read-only memory ("ROM"), a random access memory ("RAM"), an EPROM, an EEPROM, a flash component, or the like.

The descriptions in this specification are provided to enable a person skilled in the art to perform or use the present disclosure. Various modifications to the present disclosure are easily apparent to a person skilled in the art, and the general principles defined in this specification may be applied to other variations without departing from the spirit or scope of the present disclosure. Therefore, the present disclosure is not limited to the embodiments and designs described in this specification, but is endowed with the broadest scope consistent with the principles and novel features disclosed in this specification.

We claim:

1. An automated guided forklift, comprising a controller, the controller executing program instructions to perform operations comprising the following:

receiving first optical data;

determining depth information of an object based on the first optical data;

receiving second optical data, the second optical data comprising optical information of the object and optical information of a fork of the automated guided forklift;

determining a first height difference between the object and the fork based at least in part on the depth information and the second optical data, wherein the second optical data is processed based at least in part on the depth information, to obtain a first line corresponding to the object, a second line corresponding to the fork, and a third line intersecting with the first line and the second line; and moving the fork based at least in part on the first height difference until the first height difference satisfies an insertion condition.

2. The automated guided forklift according to claim 1, wherein the operations further comprise:

determining a first intersection point of the third line and the first line;

determining a second intersection point of the third line and the second line; and determining a distance value between the first intersection point and the second intersection point.

3. The automated guided forklift according to claim 2, wherein the operations further comprise determining the first height difference based at least in part on the distance value.

4. The automated guided forklift according to claim 3, wherein the operations further comprise:

determining a first value based at least in part on the distance value;

determining a second height difference between an upper surface of the object and a lower surface of the fork based at least in part on the first value; and determining the first height difference based at least in part on the second height difference.

5. The automated guided forklift according to claim 1, wherein the operations further comprise:

extracting a group of contour edge lines from the second optical data; and removing a line satisfying a first condition in the contour edge lines.

6. The automated guided forklift according to claim 5, wherein the first condition comprises that an angle between the line and a Z axis in a coordinate system is greater than 0° and less than or equal to a first threshold.

7. The automated guided forklift according to claim 6, wherein the first threshold is about 10°.

8. The automated guided forklift according to claim 5, wherein the first condition comprises that a length pixel value of the line is less than or equal to a second threshold.

9. The automated guided forklift according to claim 8, wherein the second threshold is a pixel value threshold, and the pixel value threshold is about 20.

10. The automated guided forklift according to claim 5, wherein the first condition comprises that an angle between the line and a Z axis in a coordinate system is greater than 0° and less than or equal to a first threshold, and a length pixel value of the line is less than or equal to a second threshold.

11. The automated guided forklift according to claim 10, wherein the first threshold is about 10°, the second threshold is a pixel value threshold, and the pixel value threshold is about 20.

12. The automated guided forklift according to claim 1, wherein the operations further comprise:
    determining a fourth line based on position information of the object in three-dimensional space, the preset insertion height of the fork, the thickness of the object, and the second optical data, the fourth line being located between an upper edge and a lower edge of the object; and
    positioning the first line near the fourth line.

13. The automated guided forklift according to claim 12, wherein the operations further comprise:
    respectively traversing in a first direction by using a corresponding pixel of the fourth line as a start point, until a first black pixel point is found during each traversal; and
    performing least squares line fitting on all found black pixel points, to obtain the first line.

14. The automated guided forklift according to claim 1, wherein the operations further comprise:
    determining a fifth line based on a position of the fork and the second optical data, the fifth line being located between an outer side edge and an inner side edge of the fork; and
    positioning the second line near the fifth line.

15. The automated guided forklift according to claim 14, wherein the operations further comprise:
    respectively traversing in a first direction by using a corresponding pixel of the fifth line as a start point, until a first black pixel point is found during each traversal; and
    performing least squares line fitting on all found black pixel points, to obtain the second line.

16. The automated guided forklift according to claim 1, wherein the operations further comprise:
    moving the fork after determining that the first height difference satisfies the insertion condition, to enable the fork to be inserted into docking holes below the object; and
    when the first height difference is less than or equal to a difference between a height value of the docking holes and a thickness value of the fork, determining that the first height difference satisfies the insertion condition.

17. The automated guided forklift according to claim 1, wherein a first line corresponds to an upper edge of the object, and a second line corresponds to an outer side edge of the fork.

18. A method for controlling an automated guided forklift, comprising:
    receiving first optical data;
    determining depth information of an object based on the first optical data;
    receiving second optical data, the second optical data comprising optical information of the object and optical information of a fork of the automated guided forklift;
    determining a first height difference between the object and the fork based at least in part on the depth information and the second optical data, wherein the second optical data is processed based at least in part on the depth information, to obtain a first line corresponding to the object, a second line corresponding to the fork, and a third line intersecting with the first line and the second line; and
    moving the fork based at least in part on the first height difference until the first height difference satisfies an insertion condition.

19. A controller, configured to execute program instructions to perform operations comprising the following:
    receiving first optical data;
    determining depth information of an object based on the first optical data;
    receiving second optical data, the second optical data comprising optical information of the object and optical information of a fork of the automated guided forklift;
    determining a first height difference between the object and the fork based at least in part on the depth information and the second optical data, wherein the second optical data is processed based at least in part on the depth information, to obtain a first line corresponding to the object, a second line corresponding to the fork, and a third line intersecting with the first line and the second line; and
    moving the fork based at least in part on the first height difference until the first height difference satisfies an insertion condition.

* * * * *